United States Patent [19]
Ishida

[11] 3,871,567
[45] Mar. 18, 1975

[54] APPARATUS FOR TRAVERSING A WORKPIECE WITH A WORKING HEAD

[75] Inventor: Michiyasu Ishida, Nagaokakyo, Japan

[73] Assignee: Mitsubishi Jukogyo Kabushiki Kaisha, Tokyo, Japan

[22] Filed: Jan. 8, 1974

[21] Appl. No.: 431,720

[30] Foreign Application Priority Data
Jan. 8, 1973   Japan .................................. 48-5342

[52] U.S. Cl. .................. 228/32, 219/125 R, 180/79
[51] Int. Cl. .......................................... B23k 37/02
[58] Field of Search ...................... 228/8, 9, 25, 32; 219/125 R, 125 PL, 126; 29/470, 471.1; 180/79, 79.1; 318/578

[56] References Cited
UNITED STATES PATENTS

| | | |
|---|---|---|
| 1,983,321 | 12/1934 | Stephens et al. ................. 219/125 R |
| 2,427,696 | 9/1947 | Trombetta ....................... 228/32 X |
| 3,469,068 | 9/1969 | Wall, Jr. ............................ 219/125 R |
| 3,740,526 | 6/1973 | Jackson et al. ............. 219/125 R X |
| 3,764,777 | 10/1973 | Sakabe et al. .................... 219/125 R |
| 3,781,510 | 12/1973 | Ploetz et al. ................ 219/125 R X |

*Primary Examiner*—Al Lawrence Smith
*Assistant Examiner*—K. J. Ramsey
*Attorney, Agent, or Firm*—Cushman, Darby & Cushman

[57] ABSTRACT

A travelling truck is provided with sidewall engaging wheels at its corners so it may roll in contact with sidewalls of the lattice form of structure. The truck carries a turret-like lattice profiling member, which in turn, mounts a working head. The lattice profiling member includes a cam for indexing the working head radially as the turret rotates when the truck changes direction at a corner. This compound movement permits e.g., uniform welding of a fillet at the juncture of the lattice and the base plate, even where elements of the lattice intersect.

7 Claims, 11 Drawing Figures

APPARATUS FOR TRAVERSING A WORKPIECE WITH A WORKING HEAD

BACKGROUND OF THE INVENTION

In steel constructions such as, for example, a hull of a steel ship, there are many component structures, and almost all of these structures are fabricated by welding. More particularly, with reference to FIG. 1 of the drawings, it is typically necessary not only to weld along an edge line from point *a* to point *b* but also to weld continuously along an edge line *b–c* intersecting at a right angle with said first edge line *a–b*. In addition to the welding work, various other tasks such as inspection, surface finishing, cleaning, painting, and the like are often required to be carried out along these edge lines.

An automatic welding apparatus which can carry out such linear welding is disclosed in Japanese Patent Publication No. 15410/1971. However, in case of this known apparatus, in order to conduct the welding from one corner to another corner it is necessary to displace a welding torch within the welding apparatus, and as a result, the structure of the apparatus is complexed, the weight is increased, and difficulties occur frequently. Furthermore, when it is desired to weld along the edge line *b–c* which intersects at a right angle with the previously welded edge line *a–b*, the entire apparatus must be displaced for resetting, and if there exist protrusions *d* as illustrated in FIG. 1, sometimes it is impossible to continue welding up to the terminal end within the construction.

There are many occasions where ship components or the like are fabricated by welding lattice-like cross-laid ribs to a plate as stiffening means therefor. Within each lattice cell, the ribs are welded at their base to the plate, a smooth welding fillet being much sought after. Beside the welding work, inspection, surface finishing, cleaning and the like need to be carried out at the same work sites.

SUMMARY OF THE INVENTION

A travelling truck is provided which can freely travel within a lattice form of structure and which can freely rotate about one point on said travelling truck, a lattice profiling member mounted on said travelling truck in such manner that said lattice profiling member can freely rotate relative to said travelling truck but if necessary, the form may be fixed to the latter. A working head is mounted on said travelling truck so as to be movable only along any radius passing through the center of rotation of said travelling truck. A cam member is provided, adapted to be directed in a predetermined direction with respect to said lattice form of structure regardless of the travelling and/or rotation of said travelling truck for regulating the extent of radial movement of said working head, so that the angle formed between two straight lines connecting the adjacent contact portions on the lattice profiling member where said lattice profiling member makes contact with the wall surface of said lattice form of structure is equal to the angle formed by the lattice of said lattice form of structure. The cam face of said cam member is shaped in such manner the locus of the tip end of said working head may follow a line that is identical or parallel to a corner edge line of the lattice form of structure.

Since the corner guide means according to the present device is constructed as described above, if the lattice profiling member is fixed to the travelling truck and if the travelling truck is caused to travel while maintaining the contact portions of the lattice profiling member in contact with the wall surface of the lattice form of structure, then the travelling truck travels in parallel to the wall surface of the lattice form of structure as guided by the lattice profiling member, so that the working head moves in parallel to the travelling path of the travelling truck while maintaining a fixed extent of radial movement of the lattice formed structure, and thereby the working head can move along a line that is parallel to the wall surface of the lattice form of structure to achieve the desired work.

According to the present device, when the travelling truck has reached the cross point between the wall surfaces in the lattice form of structure and thus it stops at the corner portion of the lattice form of structure with the lattice profiling member abutting against another wall surface intersecting with first said wall surface which has been profiled up to that time by said lattice profiling member, the travelling truck and the working head integrally rotate about said one point on the travelling truck. Then owing to the function of the cam face of the lattice profiling cam member, the tip end of the working head traces a locus in parallel to the wall surface along which said travelling truck has been travelling up to that time, thereafter said tip end changes the direction of tracing by an angle equal to the angle formed between the first-mentioned wall surface and another wall surface intersecting therewith, and then it further traces a locus in parallel to said other wall surface, whereby the desired work can be achieved automatically and continuously over the entire inner periphery of the wall surfaces in said lattice form of structure.

The principles of the invention wil be further hereinafter discussed with reference to the drawings wherein preferred embodiments are shown. The specifics illustrated in the drawings are intended to exemplify, rather than limit, aspects of the invention as defined in the claims.

DETAILED DESCRIPTION OF PRESENTLY PREFERRED EMBODIMENTS OF THE INVENTION

The Method

Figure 2:
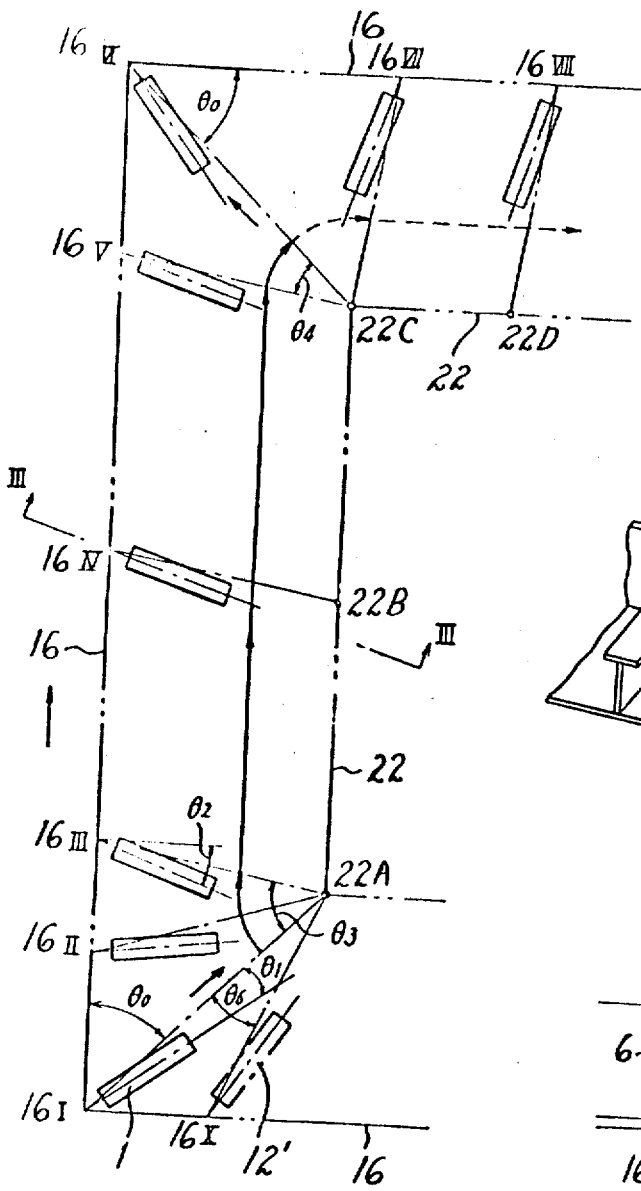
FIG. 2 is a schematic, fragmentary plan view of the workpiece showing work being applied thereto by this method.
Figure 1:
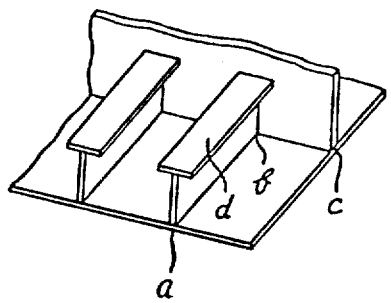
FIG. 1 is a perspective view of a typical workpiece to be fabricated or otherwise worked upon by the method described herein.
Figure 3:
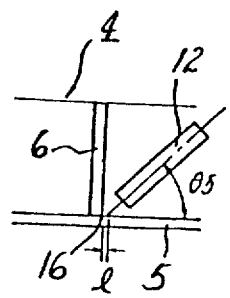
FIG. 3 is a schematic, fragmentary cross-sectional view on line III—III of FIG. 2.
Figure 4:
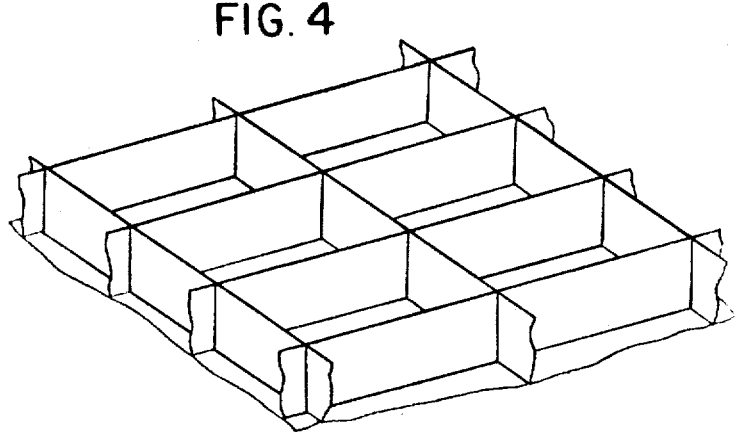
FIG. 4 is a perspective view of a typical lattice-like ship component including cross-laid ribs to be welded to a plate in accordance with the invention.

Referring to FIGS. 2 and 3, reference numeral 12 designates a welding torch e.g., of solid wire type, and the welding conditions for the torch 12 are typically preselected at a wire diameter of 1.6 mm, a welding current of 450A, a welding voltage of 42 - 43V, a wire directed position of = 1.5 - 2 mm (see FIG. 3), and a welding speed of 800 mm/sec (in case of a leg length of 5 mm).

Reference numeral 4 designates a workpiece comprising a bottom plate 5 and a lattice form of side plates 6 which stand at a right angle to the bottom plate 5 and intersect at a right angle with each other, in which a welding line 16 where the bottom plate 5 and the side plate 6 intersect with each other, intersects at a right angle with another welding line 16 within a horizontal plane as illustrated in FIG. 2.

Reference numeral 22 designates a locus of a pivotal position for the torch 12, which is spaced from said welding line 16 at a predetermined distance in parallel thereto.

Reference symbol $\theta_0$ represents the angle formed between a straight line connecting a cross point 22A between adjacent loci 22 of a pivotal position and another cross point 16I between adjacent welding lines 16 and the welding lines 16. This angle $\theta_0$ is equal to 45° in the illustrated case, since the angle formed between the adjacent welding lines 16 is a right angle.

In addition, reference symbol $\theta_1$ represents the angle formed between the radial movement lines 16I - 22A, 16II - 22A, 16III - 22A, 16IV - 22B, 16V - 22C, 16VI - 22C, 16VII, 22C, 16VIII - 22D and the axis of the welding torch 12. In this example, angle $\theta_1$ is preset at $\theta_1 = 5°$. Reference symbol $\theta_2$ represents the angle formed between the axis of the welding torch 12 positioned in the rectilinear movement section 16III to 16V and the normals to the welding line 16. In this example, angle $\theta_2$ is preset at $\theta_2 = 10°$.

Still further, reference symbol $\theta_3$ represents the rotational angle of the radial movement lines 16I - 22A to 16III - 22A of the welding torch from the corner 16I of the welding line 16 up to the rectilinear movement section 16III - 16V, and from the aforementioned definition and preset values it is obvious that the angle $\theta_3$ takes the value of $\theta_3 = 90° - \theta_0 + \theta_2 - \theta_1 = 45° + 10° - 5° = 50°$. Reference symbol $\theta_4$ represents the rotational angle of the radial movement lines 16V - 22C to 16VI - 22C of the welding torch from the rectilinear movement section 16III - 16V up to the corner 16VI of the welding line 16, and said angle $\theta_4$ is equal to 40°, in the illustrated case.

In FIG. 3, reference symbol $\theta_5$ represents the angle formed between the axis of the welding torch 12 and the bottom plate 5 of the work 4, and said angle is preset at $\theta_5 = 45°$, in the illustrated example.

Since the embodiment illustrated in FIGS. 2 and 3 is constructed as described above, starting from the state where the tip end of the welding torch 12 is directed to the corner 16I of the welding line 16 and the wire directed position is preset at $l = 1.5 - 2$ mm, the welding torch 12 is rotated in the clockwise direction about the cross point 22A between said loci 22 of the pivotal position, and simultaneously therewith said welding torch 12 is moved towards the center of rotation 22A along the radial movement lines 16I - 22A, 16II - 22A and 16III - 22A, respectively, of the welding torch, whereby welding can be carried out over the welding region 16I to 16III while maintaining the wire directed position $l$ constant.

Then, after the welding torch 12 has reached the welding position 16V, the welding torch 12 is again rotated in the clockwise direction about the cross point 22C, and simultaneously therewith the welding torch 12 is moved towards the welding line 16 along the radial movement lines 16V - 22C and 16VI - 22C, respectively, of the welding torch, whereby welding can be carried out over the welding region 16V to 16VI while maintaining the wire directed position $l$ constant.

Further in the welding region 16VI to 16VII, by repeating the same operation as conducted in said welding region 16I to 16III, fillet welding can be carried out in a similar manner.

As described, according to the embodiment illustrated in FIGS. 2 and 3, welding can be carried out continuously not only in the rectilinear movement section 16III to 16V but also in the sections 16I to 16III and 16V to 16VI in the proximity of the corner 16I and 16VI, respectively, without interrupting the welding operation.

According to one modified embodiment of the present invention, in addition to the welding torch 12 disposed at the welding position 16I, a second welding torch 12' can be provided in such manner that a radial movement line 16X - 22A for the second welding torch is preset at an angle of $\theta_6$ with respect to the radial movement line 16I - 22A of said welding torch 12 and the axis of said second welding torch is directed at a preset angle of $\theta_7$ with respect to said radial movement line 16X - 22A. If the driving means for the welding torches 12 and 12' are divided into upper and lower sections, or if the driving means are separated so as not to be extended up to the point 22A, then it is possible to make use of the two welding torches 12 and 12' simultaneously for carrying out two kinds of welding works simultaneously.

Furthermore, three or more welding torches can be simultaneously utilized in accordance with the invention.

The Apparatus

Reference numeral 1 designates a travelling truck, which is supported on a bottom plate 5 of a lattice form of structure 4 by the intermediary of a driving wheel 2 and a freely rotatable caster 3. For stability, more such wheels and/or casters may be provided.

Figure 9:
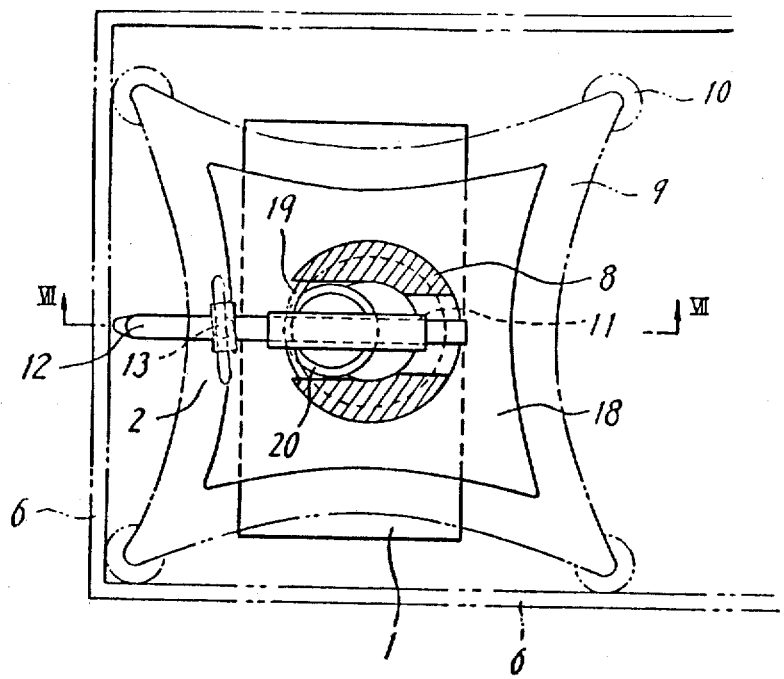
FIGS. 9, 10 and 11 are views respectively comparing to FIGS. 5, 6 and 7, but of a modified form of apparatus.

As shown apparently in FIG. 9, the driving wheel 2 is inclined towards the side wall 6 relative to the direction of advance, so as to propell the device parallel to said side wall 6.

Figure 7:
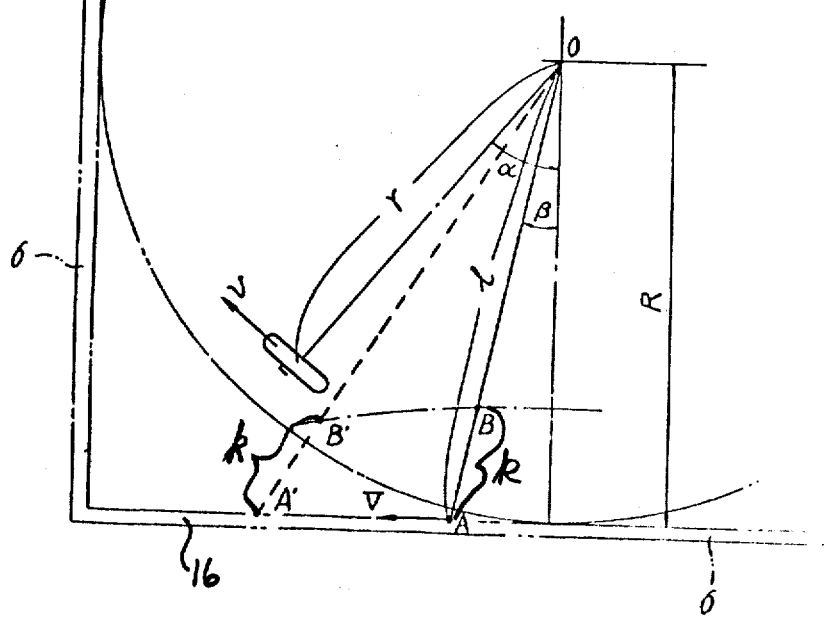
FIG. 7 is a diagrammatic, fragmentary plan view, similar to FIG. 2, of a mode of operation of the apparatus of FIG. 5.

At the center of the bottom of the travelling truck there is provided a suction device 7, so that when the suction device 7 is actuated to "lock" to the bottom plate 5 of the lattice form of structure 4, the travelling truck can rotate about a point O in FIG. 7 which vertically aligns with the axis of the sucker device 7.

At the top of the travelling truck 1 is integrally disposed a guide member 8, and a generally square lattice profiling plate 9 is fitted around said guide member 8 so as to be freely rotatable about said point O. At the four corners of the lattice profiling plate 9 there are rotatably mounted respective side wall surface profiling rollers 10 so as to be positioned at the respective apexes of a square having its center located at the point O. The lattice profiling plate 9 may be integrally, releasably fixed to said guide member 8 by means of a locking device.

Said locking device, although not shown in the drawings, for instance, comprises apertures provided at uniform intervals on the latice profiling plate 9, and a locking solenoid provided on the truck 1, having a shaft which engages or disengages with said apertures.

A limit switch (not shown) is projected from the truck which operates so as to disengage said shaft of the locking solenoid with said aperture when contacting with the surface of the next wall intersecting with the wall surface under operation. And when the locking solenoid rotates by a certain angle together with the truck 1, the supply of electricity to the locking solenoid is interrupted, and the solenoid continues rotating with its shaft pressed against the lattice profiling plate by means of the spring provided therewith, and after having rotated by 90°, the shaft of the locking solenoid engages with the next aperture on the lattice profiling plate.

In addition, a sleeve bearing in the form of a tubular cylinder 11 directed in a horizontal direction is integrally mounted on the travelling truck 1, a horizontal support portion of a working head 12 such as, for example, a welding torch being slidably fitted in the cylinder 11. A pin 13 is integrally secured to the working head 12 and directed in a vertical direction being slidably fitted in a working head guide cam groove 14 that is formed integrally with said lattice profiling plate 9, and between said cylinder 11 and said pin 13 is provided a compression spring 15 that is fitted around a horizontal support portion of said working head 12.

The working head guide cam groove 14 is formed so as to conform to the locus of point B (FIG. 7) which is located at a fixed distance k from point A along a segment of line OA connecting the center of rotation O and any arbitrary point A on the welding line 16 along the side wall surface 6 of the lattice form of structure 4 as shown by a single dot chain line BB' in FIG. 7, so that when said travelling truck 1 and said working head 12 rotate about point O, the tip end of the working head 12 may be moved along, always in parallel to an intersecting corner edge 16 between the bottom plate 5 and the side wall surface 6.

Figure 5:
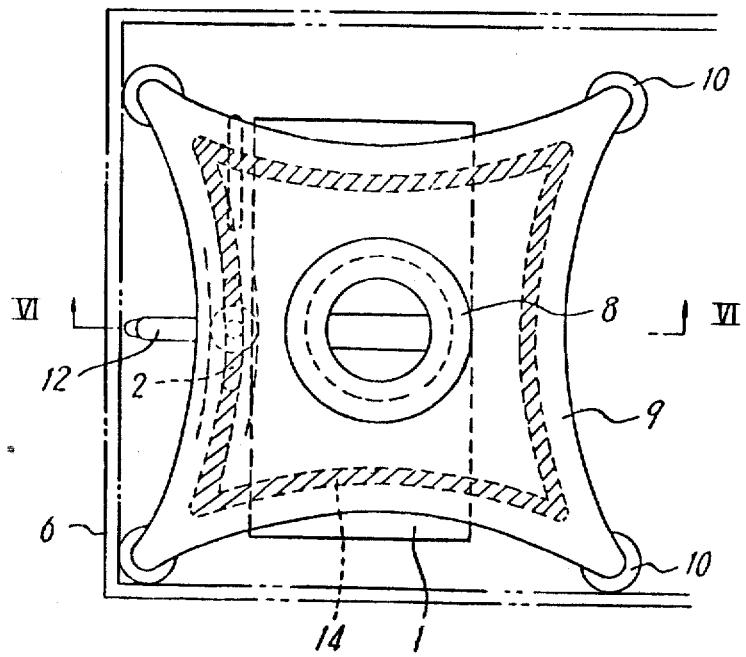
FIG. 5 is a plan view of apparatus for performing the method described in respect to FIGS. 1-3 on a component as is illustrated in FIG. 4.
Figure 6:
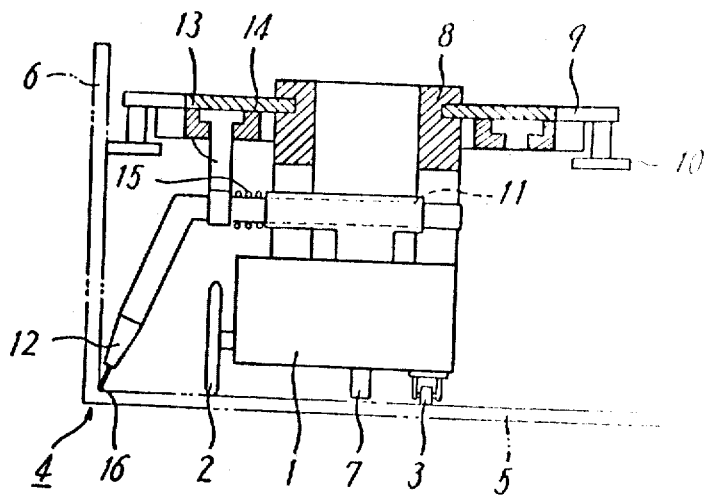
FIG. 6 is a longitudinal cross-sectional view taken along line V—V of FIG. 5.

Since the embodiment of the apparatus illustrated in FIGS. 5 and 6 is constructed as described above, as shown in FIG. 8, the travelling truck 1 located at position P1 within one lattice section of the lattice form of structure 4 is caused to travel by itself (e.g., by driving wheel 2) towards one of the side wall surfaces 6 of said lattice form of structure 4 up to position P2, the lattice profiling plate 9 being then caused to rotate until two adjacent ones of the side wall surface profiling rollers 10 make contact with said one side wall surface 6, said travelling truck 1 being also caused to rotate until said working head 12 is directed at a desired angle (e.g., the angle $\theta_2$ of FIG. 2) to said one side wall surface 6 (the state shown at P3 in FIG. 8), and thereafter said travelling truck 1 is caused to travel along said one side wall surface 6 with said lattice profiling plate 9 being fixed to said guide member 8. Then the tip end of said working head 12 can move along the intersecting corner edge 16 between the bottom plate 5 and the side wall surface 6 of the lattice form of structure 4 to achieve the desired work such as fillet welding.

When the two side wall surface profiling rollers 10 on the front side in the direction of advance have made contact with another side wall surface 6 intersecting at a right angle with said one side wall surface 6 (at the position P4 in FIG. 8), the suction device 7 is actuated to fix the truck at this position and the guide member 8 is made free to rotate with respect to the profiling plate 9. At that time, as described above, said limit switch operates so as to disengage the shaft of the locking solenoid with the aperture on the lattice profiling plate 9, and the rotational moment due to the distance of eccentricity between the driving wheel 2 and the center O of the truck 1 acts upon the travelling truck 1 and working head 12 integrally so that they may rotate about O by 90° relative to the lattice profiling plate 9, and the shaft of the locking solenoid engages with the next aperture on the lattice profiling plate 9.

During this rotation about point O (which lies on the axis of the suction device 7), since the work head guide cam groove 14 is shaped as illustrated in FIG. 7, the tip end of the working head 12 moves along the intersecting corner edge 16 between the bottom plate 5 and said one side wall surface 6 of the lattice form of structure 4, and after arriving at the corner where said one side wall surface 6 intersects with another side wall surface 6, it changes the direction of an advance by 90°, and thus it moves along the intersecting corner edge 16 between the bottom plate 5 and said another side wall surface.

Figure 8:
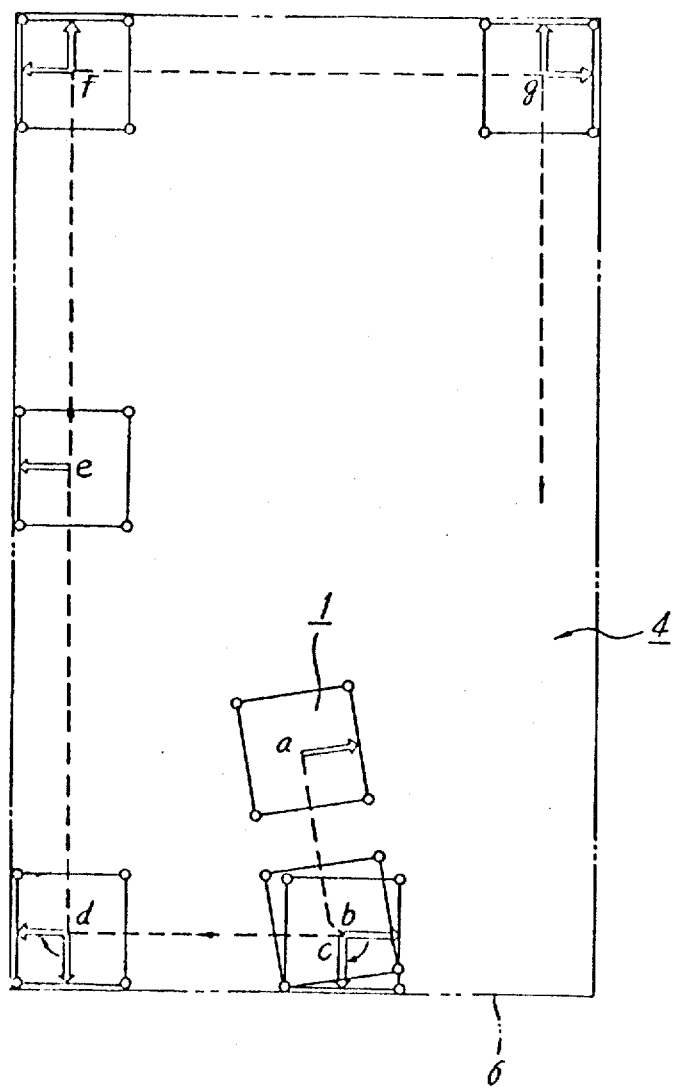
FIG. 8 is a schematic plan view of one complete lattice cell showing the progress of the apparatus of FIG. 5 thereabout as the method is performed.

After the travelling truck 1 and the working head 12 have completed the rotation of 90° at position P4 in FIG. 8, the actuation of the suction device 7 is interrupted, and said travelling truck 1 is caused to travel along said another side wall surface 6 with said lattice profiling plate 9 being integrally fixed to said guide member 8 (the state shown at P5 in FIG. 8). When they have reached the corner portion P6 where said other side wall surface 6 and still another side wall surface 6 intersect with each other, they are caused to operate in a similar manner to the operation at position P4, and by repeating the above described series of operations the tip end of the working head 12 is caused to move along the entire inner periphery of one lattice section in the lattice form of structure 4, whereby the desired work such as fillet welding can be achieved.

While the cross point between the axis of said working head 12 and the lattice form of structure was positioned on the intersecting corner edge 16 between the bottom plate 5 and the side wall surface 6 of said lattice form of structure 4 in the aforementioned embodiment, by changing the mounting position of the pin 13 with respect to working head 12 it is possible to displace the cross point between the axis of said working head 12 and the lattice form of structure 4 either to the side of the bottom plate 5 or to the side of the side wall surface 6, if desired. It is to be noted that such relative positioning of the cross point with respect to the intersecting corner edge 16 can be maintained constant not only during the rectilinear travelling of the travelling truck 1 but also during the rotation of the same.

Figure 10:
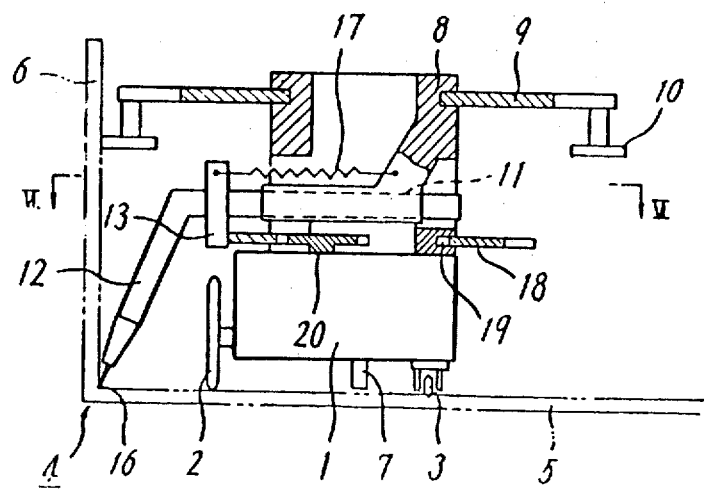
Figure 11:
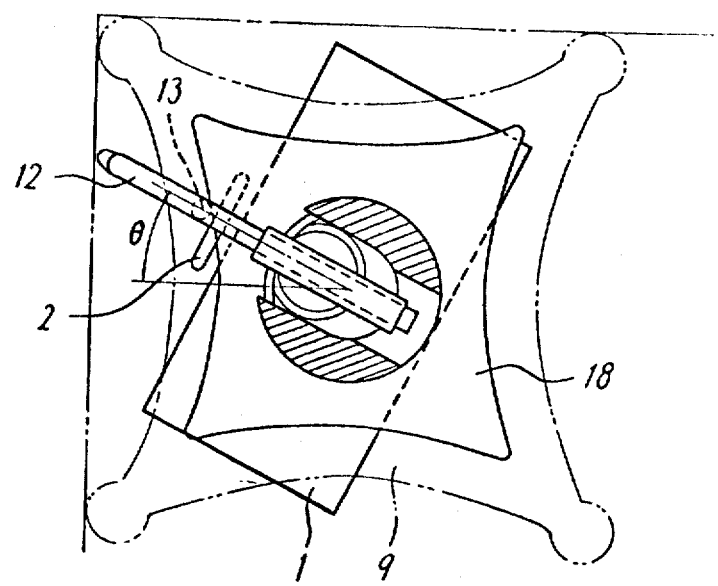

While the working head guide cam groove 14 was integrally formed in the lattice profiling plate 9 according to the embodiment illustrated in FIGS. 5 and 6, in a modified embodiment illustrated in FIGS. 9 to 11, a cam plate 18 having the same shape as said working head guide cam groove 14 is rotatable mounted on said guide member 8 separately from the lattice profiling plate 9, an inner gear 19 provided along an inner periphery of said cam plate 18 is meshed with a gear 20, a tension spring 17 is provided as stretched in place of the compression spring 15, and the gear ratio between said inner gear 19 and the gear 20 as well as the rotational speed of the gear 20 are selected in such manner that during the rotation of the travelling truck 1 the cam plate 18 may be maintained at a fixed relative position with respect to said lattice profiling plate as shown in FIG. 11. Then the same function and advantage as those of the first embodiment illustrated in FIGS. 5 and 6 can be realized.

While the above-described embodiments are applicable to a rectangular lattice form of structure, even in the case that the lattice is of the shape of parallelogram, the desired objects can be achieved by simulating the relative position between the pivots of said side wall surface profiling rollers 10 to the parallelogram.

While the present invention has been described above with reference to its preferred embodiments as applied to a welding process, it will be readily appreciated by those skilled in the art that the subject inventive concept can be equally applicable to an automatic process of other workings such as, for instance, inspection, surface finishing, cleaning, painting, etc., simply by replacing the necessary working head for the above-described welding torch. Therefore, it should be clearly understood that the present invention is not limited to the illustrated embodiments and many changes and modifications could be made without departing from the scope of the invention as defined in the appended claims.

It should now be apparent that the apparatus for transversing a workpiece with a working head as described hereinabove possesses each of the attributes set forth in the specification under the heading "Summary of the Invention" hereinbefore. Because the apparatus for traversing a workpiece with a working head of the invention can be modified to some extent without departing from the principles of the invention as they have been outlined and explained in this specification, the present invention should be understood as encompassing all such modifications as are within the spirit and scope of the following claims.

I claim:

1. Apparatus for applying work to a workpiece which has at least two upstanding walls which meet one another at an inside corner, comprising:
    a travelling truck having support means which permit the truck to be supported for lateral relative movement along beside the walls;
    a working head for performing a task with respect to the walls;
    means mounting the working head on the travelling truck for projection and retraction of the working head with respect to the travelling truck;
    turret means mounted on the travelling truck for relative rotation of the truck with respect to the turret about an axis generally vertical relative to the travelling truck;
    at least three wall engaging means on the turret means, disposed in a pattern complementing the angularity of the walls with respect to one another, so that the truck may travel along one of the walls with a first and a second of the wall engaging means in moving contact therewith, until, as the inside corner is reached, the second of these two wall engaging means additionally contacts the other of the walls which meets at the corner, and the third of the wall engaging means contacts said other wall, and so that as the truck travels away from the corner along said other wall, the first and second of the wall engaging means are parted from said one wall and the second and third of the wall engaging means remain in contact with said other wall;
    mutually engaging cam and follower means mounted on the turret and working head, respectively, the cam being profiled to urge projection and retraction of the working head with respect to the travelling truck, when the three wall engaging means are in contact with said walls, according to a pattern which preserves the juxtaposition of the working head and the respective one of the walls toward and past the corner as the travelling truck is rotated, about said axis relative to the turret, through an angle matching the angle included between the two walls.

2. The apparatus of claim 1 wherein the working head is a welding torch.

3. The apparatus of claim 1 wherein the axis along which the working head is extended and retracted intersects the axis about which the travelling truck rotates relative to the turret, so the extension and retraction is essentially a radial reciprocation.

4. The apparatus of claim 1 further including suction head means mounted on the travelling truck and aimed downwardly along said axis to, when operating, secure the travelling truck against translation as the travelling truck is rotated relative to the turret.

5. The apparatus of claim 1 wherein the wall engaging means are respectively constituted by rollers mounted for rotation about vertical axes.

6. The apparatus of claim 1 including a second working head co-mounted with the first-mentioned working on the travelling truck, so that two tasks may be performed on the walls simultaneously.

7. The apparatus of claim 1 further including a fourth wall engaging means mounted on said turret, the four wall engaging means being disposed at the corners of a square array; the cam having the general shape of a hyperbolic paraboloid, so that the apparatus may be employed to uniformly perform a task along four upstanding walls which respectively meet one another at right angles.

* * * * *